US012613720B1

(12) United States Patent
Brinksma et al.

(10) Patent No.: US 12,613,720 B1
(45) Date of Patent: Apr. 28, 2026

(54) METHOD AND SYSTEM FOR AUTOMATIC CREATION OF SOFTWARE FEATURES FOR A HETEROGENEOUS NETWORK BASED ON HUMAN BEHAVIORAL ANALYSIS

(71) Applicant: LIGHTRIVER TECHNOLOGIES, INC., Concord, CA (US)

(72) Inventors: James Michael Brinksma, Rutherford, NJ (US); Marcelo Alejandro Mcandrew, Silver Spring, MD (US); Daniel W. Rose, Red Bank, NJ (US); Shivam Mehul Patel, Morganville, NJ (US)

(73) Assignee: LIGHTRIVER TECHNOLOGIES, INC., Concord, CA (US)

( * ) Notice: Subject to any disclaimer, the term of this patent is extended or adjusted under 35 U.S.C. 154(b) by 0 days.

(21) Appl. No.: 19/329,315

(22) Filed: Sep. 15, 2025

(51) Int. Cl.
G06F 9/451          (2018.01)
H04L 67/1396       (2022.01)

(52) U.S. Cl.
CPC .......... G06F 9/451 (2018.02); H04L 67/1396 (2022.05)

(58) Field of Classification Search
CPC ..... G06F 9/451; G06F 9/453; H04L 67/1396; H04L 67/142
See application file for complete search history.

(56) References Cited

U.S. PATENT DOCUMENTS

2019/0289648 A1* 9/2019 Kim ................... H04L 12/2809
2023/0196210 A1* 6/2023 Bustelo-Killam ....... G06N 3/08
                                                                                706/12

OTHER PUBLICATIONS

Yingyuan Yang et al., PersonalA: A Lightweight Implicit Authentication System Based on Customized User Behavior Selection, Dec. 23, 2016, IEEE Transactions on Dependable And Secure Computing, vol. 16 No. 1, pp. 113-126 (Year: 2016).*
Wenfei Wang et al., Personalized Recommendation of User Interfaces Based on Foot Interaction, Aug. 28, 2023, IEEE International Conference on Ubiquitous Intelligence and Computing, pp. 1-8 (Year: 2023).*

* cited by examiner

*Primary Examiner* — Tam T Tran
(74) *Attorney, Agent, or Firm* — Sterne, Kessler, Goldstein & Fox P.L.L.C

(57)          ABSTRACT

This disclosure provides a method and system for automatic creation of software features for a heterogeneous network based on human behavioral analysis. This system tracks user information and the user's behavior over time in order to generate a historical database of their behavior. This system receives a request from the user to access data describing a communications network, via a first screen of a user interface. This request, as well as information about the user which is stored in the historical database and information about network devices associated with the user, is analyzed using statistical or machine learning methods. Based on this analysis, requirements for a software feature are generated. These requirements are made into a software feature that can be a second screen of screen displayed on the user interface, a report sent to the user, or a prompt to the user based on the user's past behavior.

20 Claims, 7 Drawing Sheets

500

500

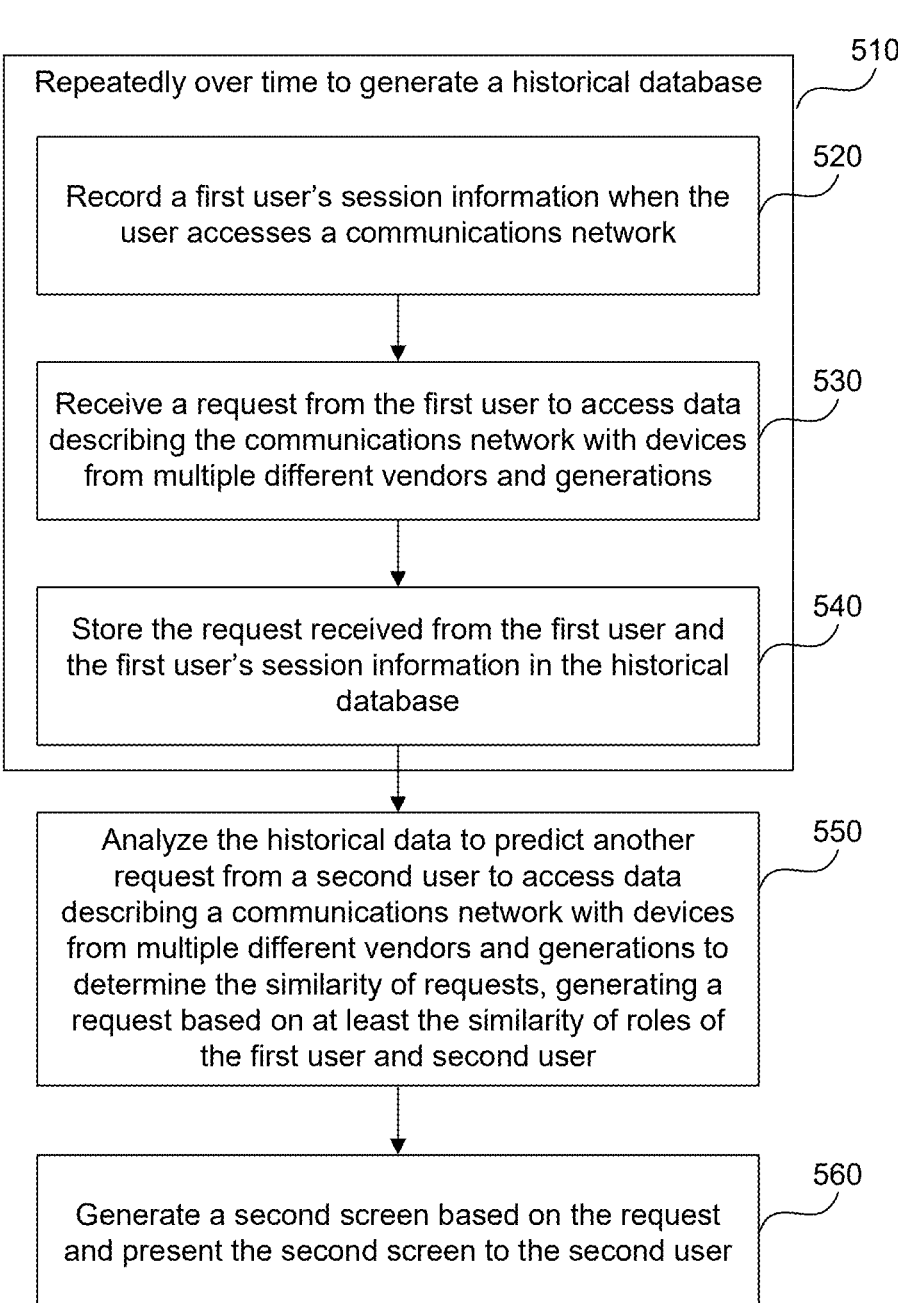

510

Repeatedly over time to generate a historical database

520

Record a first user's session information when the user accesses a communications network

530

Receive a request from the first user to access data describing the communications network with devices from multiple different vendors and generations

540

Store the request received from the first user and the first user's session information in the historical database

550

Analyze the historical data to predict another request from a second user to access data describing a communications network with devices from multiple different vendors and generations to determine the similarity of requests, generating a request based on at least the similarity of roles of the first user and second user

560

Generate a second screen based on the request and present the second screen to the second user

FIG. 5

Computer System 600

METHOD AND SYSTEM FOR AUTOMATIC CREATION OF SOFTWARE FEATURES FOR A HETEROGENEOUS NETWORK BASED ON HUMAN BEHAVIORAL ANALYSIS

FIELD

The present disclosure relates generally to generating screens of the user interface for controlling or monitoring heterogeneous communications networks.

BACKGROUND

Communication networks often including communication devices from multiple vendors and multiple generations of network technology. A communications network connecting two different cities may use different devices, across different vendors; and these devices may be serving many different clients. As an example of heterogeneous vendors, a communication network may have optical switches from Cisco Systems, Inc. of San Francisco, CA. The network may span multiple generations of technology. In the example of optical networks, multiple generations may be both Optical Transport Network (OTN) and Synchronous Optical Network (SONET). In addition, various network devices can operate layers of the network, such as Open System Interconnect (OSI) network layers, including physical (e.g., optical), data link layer (e.g. Ethernet), and network (e.g., Internet Protocol). Communications networks may also be provided by a variety of network carriers. Some examples of network carriers include Comcast, Lumen, Verizon, and AT&T.

Layered on top of the complexity of communications networks and their various devices and vendors are the users of the communications network. For any given communications network, there are users that may work only with devices from certain vendors, certain geographical areas, or for certain functionalities. Additionally, each user may have different levels of access to the communications network. For example, one user could be an administrator, and another user may only have read only access. Another layer of complexity is introduced for each carrier of a communications network. Each network carrier, for example, Verizon or AT&T, has their own sets of users and user roles. The users affiliated with one network carrier may sometimes perform similar actions to those of another carrier, but not always. It follows that for all of these different variations of users, user permissions, communications networks, network carriers, and their associated devices that there are many different possible user experiences. It is infeasible to create a single application that covers all of these different possible scenarios. Furthermore, these scenarios are constantly changing.

A software application can provide user access to various data and functionality of a communication network. For example such an application can dynamically discover network inventory. It can use the collected data for automation of the network. It can collect data from network devices and analyze it to determine whether actions need to be taken. In this way, such an application can enable of network-on-demand and customer self-serve digital experiences. However, the usefulness of the application often depends on how familiar a user is with the layout of the application, and how well-designed the application is for the particular user. Since there are so many different types of users and use cases, it is difficult to develop an application that is well designed and easy to use for all of them. Further, the usefulness of even a well-designed software application is reduced for newer users who are unfamiliar with where to find or access various data or functionality, or if the layout, functionality, data, or other visual aspects of the software application are updated or changed. In these situations, the user would have to spend time and computing resources navigating and getting familiar with the application in order to locate the data and functionality the user needs.

BRIEF SUMMARY

According to one or more aspects a system for the automatic creation of software features based on human behavioral analysis is provided. This system tracks user session information and user behavior over time to generate a historical database. A first user's session information is recorded when the first user accesses a platform to manage a communications network. A first screen of a user interface receives a first request from the first user to access data describing a first communications network with devices from multiple different vendors and across multiple different generations. The first user's request and the first user's session information are stored in the historical database. The historical data is analyzed to predict a second request for a second user to access the data describing a second communications network with devices from multiple different vendors and across multiple different generations such that the analysis generates requests at least based on similarity of roles of the first and second user. Based on the second request, a second screen of the one or more screens of the user interface is generated and presented to the second user. In different embodiments, the first and second user may be the same or different individuals.

Method and computer program product embodiments are also disclosed.

BRIEF DESCRIPTION OF THE DRAWINGS

The accompanying drawings are incorporated herein and form a part of the specification.

FIG. 5 illustrates the flow of the method for the automatic creation of software features based on human behavioral analysis.

In the drawings, like reference numbers generally indicate identical or similar elements. Additionally, generally, the left-most digit(s) of a reference number identifies the drawing in which the reference number first appears.

DETAILED DESCRIPTION

A software application can provide a user access to various data and functionality of a computing system. However, the usefulness of the user application often depends on how familiar a user is with the layout of the application's user interface, the different features of the application that are available to them, and how well-designed the user interface is for the particular user. Further, the usefulness of even a well-designed software application may be reduced with newer users who are unfamiliar with where to find or access various data or functionality of the application, or if the layout, functionality, data, or other visual aspects of the user interface are updated or changed. In these situations, the user would have to spend time and computing resources navigating and getting familiar with the user interface in order to locate the data and functionality the user needs.

A way to solve the problem of having a software application that is well designed for many different types of users and as many, if not, more, use cases is to create software features that are specific for each user. In order to do this, each user's behavior must be recorded, stored, and analyzed. Based on this analysis, software features can be automatically created by a system that are tailored to each different user's roles and actions.

Figure 1:
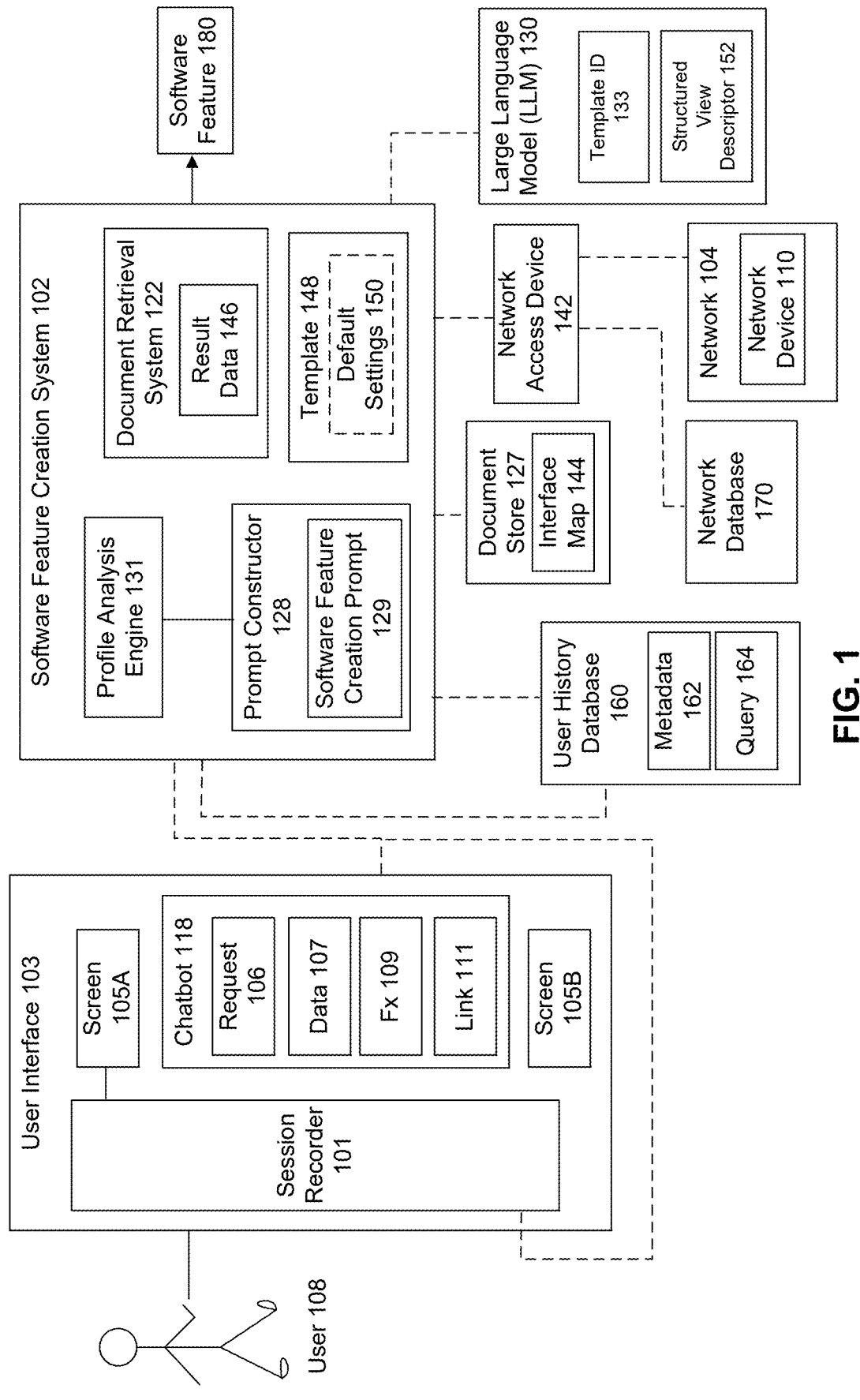
FIG. 1 is a block diagram illustrating example functionality for a system for the automatic creation of software features based on user behavior according to some embodiments.

FIG. 1 is a block diagram 100 illustrating example functionality for a system for automatic creation of software features based on human behavioral analysis, according to some embodiments. This system is represented by software feature creation system (SFCS) 102. SFCS 102 may create a software feature 180 that has a number of embodiments. SFCS 102 may create a software feature 180 that provides a user 108 with shortcuts for navigating a user interface (UI) 103 and quickly and directly accessing any requested data 107 and/or functionality from any screen 105A, 105B of the UI 103. In some embodiments, SFCS 102 may create a software feature 180 that updates existing screens 105 of the UI 103 and/or generate new screens of the UI 103 responsive to a request 106 received from the user 108. In some embodiments, SFCS 102 may create a software feature 180 that generates an automatic alert for the user 108 based on analysis of user history database 160 determined by profile analysis engine 131. In some embodiments, SFCS 102 may create a software feature 180 that appears as a prompt to the user in the interface of chatbot 118. In another embodiment, SFCS 102 may create a software feature 180 that translates a user request from the syntax of one network device 110's network carrier, vendor, operating system, or device variant to the syntax of another network device 110's using LLM 130.

User interface (UI) 103 may include any application frontend, such as a graphical user interface. UI 103 may be the frontend of any computing application, app, or program. UI 103 may be displayed on the screen of a mobile device, laptop, tablet, or any other computing device. While the UI 103 may connect to any application backend and provide any data or functionality to the user 108, for simplicity, as described herein UI 103 may allow user 108 to access and modify data associated with the operations of a network 104. The user 108 may for example access and perform functionality that modifies data that modifies the operations of one or more network devices 110 (e.g., routers, servers, switches, end-user computing devices, etc.).

Network 104 may include any communications or telecommunications network that connects two or more network devices 110 across two or more locations, through which data (e.g., including voice, Internet, streaming, etc.) may be transmit between the various different computing devices, computing nodes, network elements, or locations.

In some embodiments, the actual data transmittal functionalities of network 104 may be performed by any number of interconnected network devices 110. In some embodiments, network 104 may include an optical network and the network devices 110 may include amplifiers, multiplexers/demultiplexers, add/drop multiplexers (ADMs), regenerators, and transponders, switches, routers, or other equipment that may comprise the optical network, whose operations are monitored and/or modified in accordance with a request 106. In some embodiments, the network devices 110 may include network devices from optical layer 1, layer 2, and/or layer 3 devices.

Each network device 110 may have its own configuration or specifications, including its own unique combination of carrier, vendor, generation, and layer. Carrier may be the name, or other identifier, of the network carrier the network device 110 is affiliated with. Some example network carriers include, but are not limited to, Comcast, Lumen, Verizon, and AT&T. Vendor may be the name, or other identifier, of a company, manufacturer, and make of a network device 110. Some example vendors include, but are not limited to, Ciena, Fujitsu, Nokia, Google, and Cisco. Generation may indicate the model of a device, the firmware version, software version, year of production, or other technical features or aspects of the network device. Some example generations may include, but are not limited to, SONET (synchronous optical network), OTN (optical transport network), SDH (synchronous digital hierarchy), and DWDM (dense wavelength division multiplexing). Layer may indicate on which network layer the particular network device 110 operates.

In some embodiments, each unique combination of carrier, vendor, generation, and layer may include its own unique communications protocols, communications interface, or application programming interface (API) by which a network access device (NAD) 142 may interact and communicate with the network device 110. For simplicity, only a single network device 110 is illustrated, however it is understood network 104 may include any number of network devices 110 across different carriers, vendors, generations, and layers. In some embodiments, NAD 142 may manage and coordinate the communications and interactions across these varied multi-vendor, multi-generational, multi-layer network devices 110 affiliated with a particular network carrier in retrieving data 107 and/or performing functionality 109 requested by the user 108 as part of request 106. NAD 142 may be provide real-time inventory, reactive and proactive analytics, visualizations (map, chassis, logical, services), and test. An example is a NETFLEX system available from LightRiver, Inc. of Holmdel, NJ.

In some embodiments, NAD 142 may manage its own records or network database shown in FIG. 1 as network database 170, regarding the status of network 104 and/or network devices 110. In some embodiments, NAD 142 may periodically receive or ping network 104 and/or network devices 110 for status updates, network configurations, network maps, or otherwise receive or generate data and/or documents related to the (real-time) operational characteristics of network 104 and/or one or more network devices 110. In some embodiments, this operational data may be stored in network database 170 accessible to NAD 142 shown in FIG. 1 as network database 170, which may be periodically updated by NAD 142. Network database 170 may store an inventory of network devices 110 associated with network 104, along with metadata associated with each device. The network device metadata stored in network database 170 may include, but is not limited to, device carrier, vendor, manufacturer, generation, serial number, operational status, and total inventory for that device type.

In some embodiments, SFCS 102 may send queries to NAD 142 about data stored in network database 170 if any real-time data, network device 110 inventory, or historical network information is required to needed to process request 106 or is to be displayed on UI 103. Similarly, SFCS 102 may use information from network device 170 to determine if a request 106 is valid based on current network device 110 inventory or operational status.

UI 103 may provide an application frontend for accessing data 107 about and/or performing functionality (Fx) 109 related to modifying which data 107 is displayed in the UI 103 and/or impacting the operations of one or more network devices 110 across network 104. UI 103 may include various screens 105A, 105B (referred to herein generally as screen 105 or screens 105), each screen 105 being configured to display and provide access to some set of data 107 and/or functionality 109 related to the network 104. Each screen 105 may include any variation of user interface components (e.g., buttons, menus, tables, charts, texts, images, multimedia, etc.) with which the user 108 may interact to access the data 107 or functionality 109 and/or navigate between the various screens 105.

Conventionally, each screen 105 may be preconfigured to display a certain set of data 107 and/or functionality 109. Thus, if a first screen 105A does not include the data/ functionality desired by the user 108, the user 108 would have to interact with different user interface components to navigate to a different screen to access whatever data and/or functionality is required by the user 108. For example, a user may select a menu option from screen 105A and that may load screen 105B. For simplicity, only two screens 105 are illustrated, but it is understood that UI 103 may include any number of screens 105.

In some embodiments, session recorder 101 may record information related to the user 108 as well as the user 108's behavior and store this information in user history database 160. This information related to the user 108 may include, but is not limited to, user permissions, user identification, location information, user device information, and click information. The user permissions stored by session recorder 101 in user history database 160 may be further comprised of the following: executive, planning, provisioning, operations, and maintenance. The user identification stored by session recorder 101 may include identifying information such as the user 108's name, system ID, job function, what network carrier they are affiliated with and other user profile information. Each of these permissions may correspond to different levels of access to a communications network for a particular network carrier, and different actions performed by the user 108 in the communications network. The data may be stored as user metadata 162.

Profile analysis engine 131 may analyze user metadata 162, user queries 164, and network database 170 to determine a software feature 180 that would be useful to user 108. Based on this analysis, profile analysis engine 131 may use prompt constructor 128 to generate software feature creation prompt 129. In some embodiments, software feature creation prompt 129 may be provided to LLM 130. In this context, useful could mean a feature that is based on an action that user 108 performs frequently, such as checking the operational status of certain devices. Useful could also mean actions that other users with the same user role, but affiliated with a different network carrier than user 108, have performed recently. For example, a network maintenance technician of a communications network carried by Verizon and a network maintenance technician of a communications network carried by Lumen may both make requests 106 to upgrade the firmware of routers that are on version 11. Based on this behavior, profile analysis engine 131 may determine that a network planner of a communications network carried by another carrier such as AT&T also wants to conduct this request 106. In this example, profile analysis engine 131 would use prompt constructor 128 to assemble a software feature creation prompt 129. This software feature creation prompt 129 would be provided to LLM 130 to convert the request 106 from one that is compatible with Verizon or Lumen to one that is compatible with AT&T. Another software feature 180 that may be determined to be useful by profile analysis engine 131 may be based on information provided by network database 170. In some embodiments, this analysis could also include analyzing request 106 from user 108 using both user history database 160 and network database 170. For example, if user 108 is a network planner that makes a request 106 to schedule an upgrade for 100 Cisco devices carried by Verizon in Ohio, but there are only 70 Cisco devices carried by Verizon in Ohio, profile analysis engine 131 may analyze this request 106 against user history database 160 and network database 170. Based on this analysis, profile analysis engine 131 may use prompt constructor 128 to assemble a software feature creation prompt 129 that gives SFCS 102 instructions to create a software feature 180 to prompt user 108 that their request 106 is invalid. Another example of a software feature 180 that may be created based on the analysis of profile analysis engine 131 for the request 106 may be to update the request 106. In this example, the request 106 to upgrade 100 Verizon Cisco devices in Ohio may be converted into a software feature creation prompt 129 that uses LLM 130 to create a prompt that is an updated version of request 106 for the proper number of devices (70) to upgrade, which would be provided to the user 108.

In some embodiments, profile analysis engine 131 may use various forms of statistical and machine learning based analysis to analyze the data stored in user history database 160 and network database 170. This data may include user metadata 162, queries 164, and network device information stored in network database 170. User metadata 162 includes, but is not limited to, user permissions, user identification, location information, device information, job function, user profile, and click information. User metadata 162 may be recorded from a user session by session recorder 101 in user history database 160. User query 164 in user history database 160 may include all of the previous queries of a user 108 as well as other users 108. The data stored in network database 170 may include, but is not limited to, network device 110 carrier, vendor, manufacturer, generation, serial number, operational status, and total inventory for that device type. The data profile analysis engine 131 uses for analysis may also be based on a time window of historical information in user history database 160 and network database 170. An example of the type of analysis profile analysis engine 131 may conduct is cohort analysis. Cohort analysis segments groups of users 108 into cohorts and tracks their usage patterns over periods of time. Cohort analysis can identify trends and correlations in between and among cohorts of users 108. Another example of a type of analysis that profile engine 131 may use is longitudinal analysis. Longitudinal analysis is a method of tracking one individual user 108's behavior to identify patterns and trends in their behavior over a period of time. Profile analysis engine 131 may also use funnel analysis to determine a software feature 180 that needs to be created for a user 108. Funnel analysis tracks and analyzes a user 108's path through a software application. For example, a user with read only permissions may frequently select a menu option from screen 105A to read the status of network devices 110 that may load screen 105B. Profile analysis engine 131 may use funnel analysis based on this behavior to determine that a software feature 180 needs to be created by software feature creation system (SFCS) 102 that automatically loads screen 105B for user 108 when user 108 accesses the system. In some embodiments, these various types of analyses may be based on a particular time window of information stored in user history database 160.

In some embodiments, this time window may be for a particular user 108 over the course of the past month. For example, if user 108 makes a request 106 to see the operational status of network devices 110 5 times in the past month, a longitudinal analysis performed by profile analysis engine 131 on their historical queries 164 may predict that they are likely to make the request 106 again.

In some embodiments, this time window may be over a longer period of time, such as a year. For example, a cohort analysis performed by profile analysis engine 131 may determine that network planners with Lumen all made a request 106 to upgrade the firmware of routers in February of the previous year. Based on this cohort analysis over the time window of a year, profile analysis engine 131 may predict that network planners with Lumen may want to upgrade the firmware of routers in the upcoming February. Profile analysis engine 131 may determine that a software feature 180 needs to be created in order to facilitate that action based on this prediction. Furthermore, this cohort analysis may be used to predict that a software feature 180 that is a similar request 106 needs to be made for users affiliated with a different cohort (in this case, a wireless carrier such as Verizon). In this case, profile analysis engine 131 would use prompt constructor 128 to assemble a software feature creation prompt 129 to LLM 130 to convert the request 106 for upgrading the firmware of Lumen routers to a new request 106 for upgrading the firmware of Verizon routers. This feature would then be generated by SFCS 102 as a new software feature 180.

The windows of time that are listed as examples are not limited to the windows of time that analysis may encompass. Windows of time that are shorter or longer than the windows of time listed as examples may be used by profile analysis engine 131 to predict future requests 106 from users 108.

Profile analysis engine 131 may also use various forms of machine learning to analyze the data stored in user history database 160. In some embodiments, profile analysis engine 131 uses a type of regression such as linear regression to determine a software feature 180 that may be useful to user 108 based on their past behavior. Linear regression finds the relationships between independent variables and a desired dependent variable that is to be predicted by finding a linear equation that best fits both variables. Profile analysis engine 131 may user linear regression on the data in user history database 160 to determine and predict behavior of user 108. For example, if user 108 performs a certain request 106 that is stored as historical user requests 164 in user history database 160 20 times in a month, profile analysis engine may determine that a software feature 180 needs to be created that prompts user 108 to perform request 106 more frequently if user 108 has only performed request 106 five times during that month. Profile analysis engine 131 may also use other types of regression, including, but not limited to, ridge regression or lasso regression. In some embodiments, profile analysis engine 131 uses machine learning clustering algorithms including, but not limited to, k-nearest neighbors (KNN) or agglomerative clustering to analyze user behavior based on user history database 160. Machine learning clustering algorithms may be used to determine similarities between groups of users. In some embodiments, data clusters may be found by machine learning algorithms that correspond to users 108 with a particular network carrier. For example, a data cluster may comprise network provisioners with the carrier Verizon and another data cluster may comprise network provisioners with the carrier AT&T. It is understood by those with ordinary skill in the art that these clustering parameters can be changed. Using the previous example, changing the clustering parameters may result in a data cluster that contains all network provisioners for both Verizon and AT&T.

In some embodiments, analysis from profile analysis engine 131 using machine learning algorithms may facilitate the creation of new software features 180. For example, if the behavior of a user 108 is determined to be in a particular cluster of users 108 by the KNN algorithm, and the user 108 changes their usual actions, KNN may determine that user 108 belongs in a different cluster of users 108. Based on this machine learning analysis, profile analysis engine 131 may determine that a software feature 180 needs to be created that prompts user 108 to perform actions that would reclassify them into the previous cluster of users 108. For example, a user 108 may check the operational status of network devices 110 five times a day. If the user 108 stops checking the operational status of network devices 110, profile analysis engine 131 may use machine learning clustering analysis and determine that a software feature 180 needs to be created to remind the user 108 to check the operational status of network devices 110.

In some embodiments, profile analysis engine 131 may use forms of analysis such as cosine similarity to determine similarity between user historical requests 164. Cosine similarity measures the cosine of the angle between two vectors. This is done by calculating the dot product of the two vectors in question and dividing it by the product of their vector lengths. Cosine similarity may be used on tokenized versions of user historical requests 164 which are stored in user history database 160 to determine the similarity between requests. As will be understood by a person of ordinary skill in the art, tokenizing text involves creating numeric representations of words, segments of words, or phrases known as "tokens". When stored in vector form, cosine similarity can be performed on tokenized versions of user historical requests 164 to determine similarities between requests 106. For example, if user 108 frequently sends a request 106 "Show me the alarms for devices from ABC located in Ohio", and the next day user 108 sends a request 106 "Show me the alarms for devices from ABC located in Virginia", cosine similarity analysis performed by profile analysis engine 131 may find a lower similarity score between the two requests 106. Profile analysis engine 131 may determine based on this cosine similarity analysis that a software feature 180 needs to be created to prompt user 108 and ask for confirmation of their request 106, since it is different from their usual request 106.

In some embodiments, software feature creation system (SFCS) 102 may use information from profile analysis engine 131 that is input to prompt constructor 128 to generate a software feature creation prompt 129. Software feature creation prompt 129 may be used by SFCS 102 to automatically create a new software feature 180 for user 108. Software feature creation prompt may be used by LLM 130 to generate this new software feature. If the user 108 of provides the same or similar request 106 multiple times, SFCS 102 may use LLM 130 to prompt user 108 whether they want this request 106 to be saved and automatically executed for the user 108. If the user answers affirmatively, a software feature 180 may be created by SFCS 102 based on request 108 using software feature creation prompt 129. In some embodiments, if the user 108 requests to see the status of network device 110 multiple times at a regular time interval, SFCS 102 may use LLM 130 to ask the user 108 if the user 108 wants the status of network device 110 to be displayed automatically in screen 105 when the user logs in to the user interface 103. In some embodiments, SFCS 102 may generate a report that is sent via email to user 108 corresponding to the regular interval in which user 108 makes request 106 that is stored in user history database 160. In some embodiments, SFCS 102 may create a software feature 180 based on a software feature creation prompt 129 created by prompt constructor 128 based on profile analysis engine 131's analysis of the contents of the request 106. Software features 180 that are based on an analysis of the text of request 106 may include: rewriting a request 106 for a network device 110 of a different vendor than originally requested by the user, or correcting syntax or spelling errors of request 106.

In some embodiments, UI 103 may require the user 108 to navigate through multiple different screens 105 in order to reach their desired data or functionality, which consumes both time and uses unnecessary resources. Further, the ability of the user 108 to navigate the UI 103 requires the user 108 to already be familiar or become familiar through resource-consuming trial-and-error, with the various screens 105 of the UI 103 and what data and/or functionality is accessible from each screen 105. This navigation can be further complicated if the layout of any of the screens 105 of the UI 103 is updated or modified.

Rather than requiring the user 108 to manually navigate across the various screens 105 of UI 103 to access a desired screen 105, SFCS 102 may provide immediate and direct access to any data 107 and/or functionality 109 accessible from any screen 105 of the UI 103 from any other screen 105 of the UI 103. For example, if the user 108 is viewing screen 1, but their desired data or functionality is on screen 3, which requires navigation past screen 2, rather than requiring the user 108 to manually navigate from screen 1 to screen 2 to screen 3, SFCS 102 may provide direct access to screen 3 from screen 1 via a user interface component that may be accessible from any/all screens 105 of UI 103, such as a chatbot 118. Based on user information recorded by session recorder 101 in user history database 160, SFCS 102 may provide this immediate and direct access preemptively based on user metadata 162 and historical user requests 164 that is analyzed by profile analysis engine 131. This preemptive display and access to data 107 may be based on regular intervals of time that user 108 logs in to make request 106.

In some embodiments, chatbot 118 may provide a communications interface between SFCS 102 and a user 108. Chatbot 118 may include a computer program that is designed to simulate a conversation with a human user 108. Chatbot 118 may include any interface or interface component that enables a user 108 to access chatbot functionality or interact with another computing system, such as SFCS 102. In some embodiments, chatbot 118 may be accessible via the internet (e.g., through a website), a messaging application (including textual and/or audio communications), or any add-on messaging service that enables two-way communications. Chatbot 118 may allow user 108 to speak and/or type natural language input, which may be received as request 106. The natural language input by user 108 may include normal speaking/writing language (e.g., as opposed to requiring the user 108 to communicate through any particular communication protocols or programming language). Chatbot 118 may support multiple different natural languages (e.g., English and Spanish).

In some embodiments, chatbot 118 may be accessible to the user 108 from any screen 105 of the UI 103. So, rather than trying to figure out how to manually navigate the various screens 105 of UI 103 to perform some functionality and/or otherwise access data, the user 108 may simply provide a request 106 for data 107 and/or functionality 109 directly to chatbot 118. SFCS 102 may identify whatever screen 105 most closely corresponds to the request 106 based on an interface map 144, modify or customize an existing template 148 corresponding to the screen 105 (as needed per the request 106) to generate a structured view descriptor 152, and provide a direct link 111 to the new screen 105 to user 108. In some embodiments, the link 111 may be a hyperlink that directs the user 108 to a new screen 105 of the UI 103 generated based on the structured view descriptor 152 and responsive to the request 106. The user 108 can select the link 111 to view the new screen 105B generated based on the structured view descriptor 152 including the requested data 107 and/or functionality 109 (which may be performed on behalf of the user 108), rather than having to manually navigate the UI 103 and manually perform the functionality 109 themselves. SFCS 102 may provide a shortcut for navigating the UI 103, accessing data 107 and/or performing functionality 109.

In some embodiments, chatbot 118 may receive a request 106 from user 108. Request 106 may be any request from the user 108 to access data 107 or access/perform some functionality 109. In some embodiments, the data access request 107 may include any data-oriented request, including a request to read, access, or update a particular set of data. In some embodiments, the data access request 107 may include a request to view or access a particular screen 105 of the UI 103 (e.g., "show me the screen that has information about active devices").

In some embodiments, the functionality request 109 may include any request to access or perform some functionality accessible from any screen 105 of the UI 103. In some embodiments, the functionality request 109 may include a request to update the data 107. Updating the data may include copying data, modifying data, filtering data, adding new data, and/or deleting existing data. In some embodiments, the functionality request 109 may include a request to perform functionality that modifies the operations of one or more network devices 110. For example, the functionality request 109 may include a request to reserve a wavelength or bandwidth to transfer data from a first location to a second location using multiple different network devices 110. The functionality request 109 may be for any commands are accessible from any screen 105 (e.g., including through menu commands, buttons, or other user interface components) of UI 103, such as filtering which data is displayed on a screen 105. For example, rather than looking at all devices across all manufacturers, functionality request 109 may be for only for devices of manufacturer XYZ.

In some embodiments, chatbot 118 displays a prompt to the user 108 that is created by software feature creation system 102. This prompt may be based on analysis conducted by the profile analysis engine 131 of user metadata 162 and historical user requests 164. For example, if the user 108 checks the status of network device 110 at 8:30 AM on Monday over a certain time window, for example, 6 weeks, SFCS 102 may predict this user behavior and create a software feature 180 that prompts the user 108 a question asking if they want to see the status of network device 110 preemptively. In some embodiments, chatbot 118 will prompt user 108 to change their request 106 based on user metadata 162. For example, if user 108 inputs a command to a Cisco network device, and user 108 only has permissions for Juniper network devices, chatbot 118 may prompt the user 108 that they input a command for the wrong type of network device. SFCS 102 may use LLM 130 to generate a new request 106 for user 108 that is the user 108's original request 106 translated to the syntax of the proper device for the user's permissions, and provide it to the user via chatbot 118. In some embodiments, chatbot 118 may prompt user 108 that they need additional permissions to access network devices 110 that they do not currently have permissions to. In some embodiments, chatbot 118 may prompt user 108 to change the spelling or syntax of request 106 based on profile analysis engine 131's analysis of user 108's information, such as user permissions, stored in user history database 160.

As used herein, the term request 106 may be used generally to refer to any request 106 (for data 107 and/or functionality 109) that may be received via chatbot 118. As an example, the request 106, as received from user 108, may be "Show me the alarms for devices from ABC in Virginia." For simplicity, this request 106 for alarms data will be used as a primary example throughout this specification, however as noted other embodiments, may include any other types of requests 106 for screens 105, data 107, and/or functionality 109. For example, rather than just requesting to see the alarms, the request 106 may include a functionality clear an existing alarm. In some embodiments, request 109 may include a request to create a new alarm or delete/modify an existing alarm.

In some embodiments, alarms may be related to monitoring the utilization, performance, availability of one or more network devices 110 (e.g., routers, servers, switches, etc.). For example, an alarm may monitor one or more metrics regarding the utilization, performance, and/or availability of a particular network device 110, for when the one or more metrics drop below or rise above a related threshold value. When the threshold value is reached or exceeded, the alarm may provide an electronic notification to a user or system or perform some other action or activity (e.g., such as shutting down the network device 110).

In some embodiments, user 108 may login to UI 103, and SFCS 102 may provide an initial screen to the user 108, which may be screen 105A. In some embodiments, the initial screen 105A may include any screen from which request 106 is received. In some embodiments, the initial screen 105A may include a home screen that is presented to any authenticated user 108, or may include user-specific customizations.

In situations where there is no historical data, such as when a first user logs into system, SFCS 102 may provide suggestions for new software features based on the user's profile. For example, the user may be have a particular role at a particular carrier (e.g., a provisioner at Verizon). SFCS 102 may have baseline suggestions each user profile that can be used initially. These suggestions may be continuously refined based on real user behavior in the system.

Figure 2A:
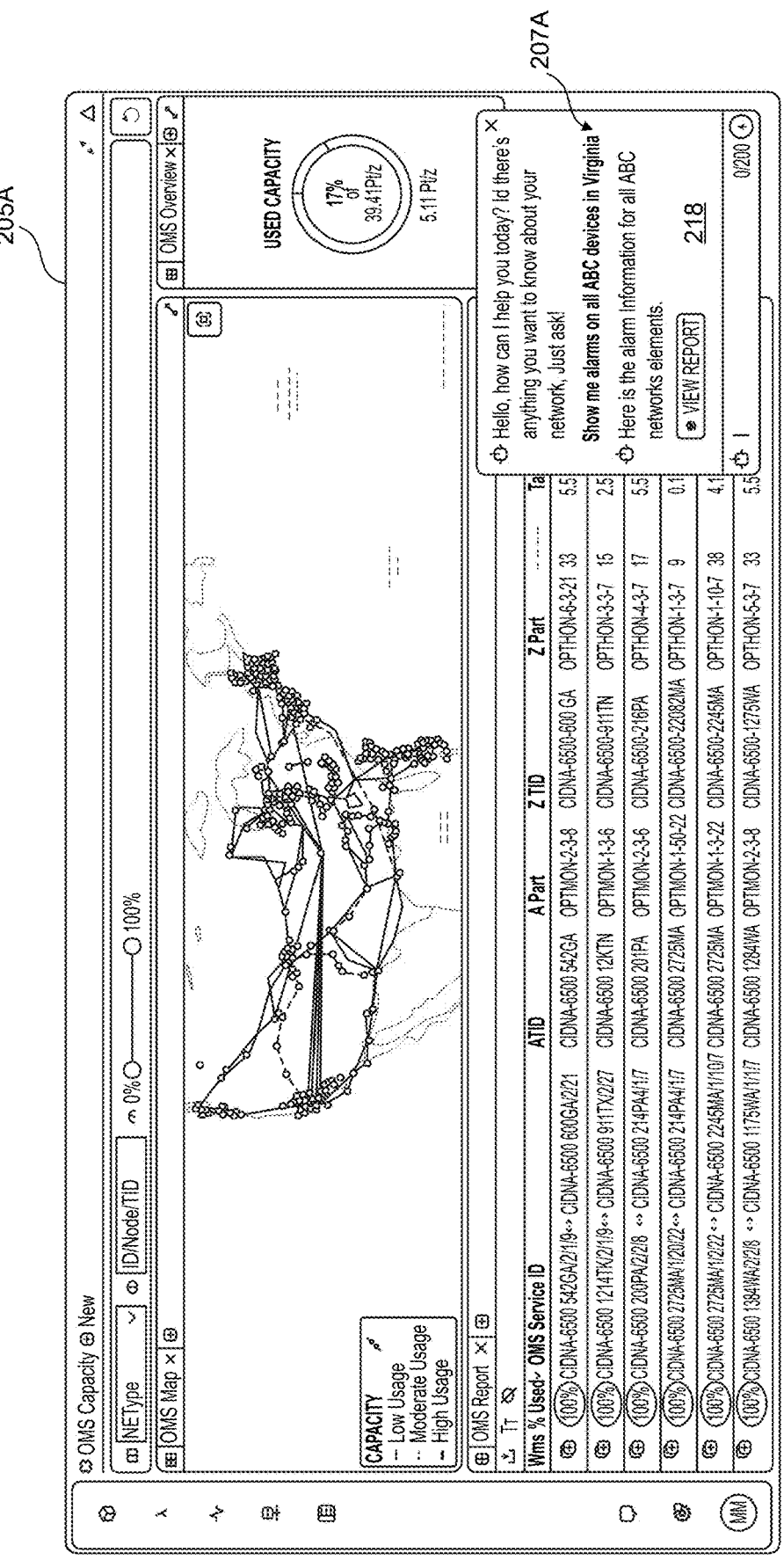
FIG. 2A illustrates an example initial screen of user interface which receives a request from a user, according to some embodiments.

FIG. 2A illustrates an example initial screen 205A of user interface 103 which receives a request 106 from a user 108, according to some embodiments. This request 106 may be stored, along with metadata corresponding to user 108, in user history database 160 (not shown in FIG. 2A) by session recorder 101. The initial screen 205A is an example of an initial screen 105A as illustrated in FIG. 1. Initial screen

205A is just an example, and in other embodiments, the initial screen 205A may include any other data and/or functionality. Initial screen 205A may include a chatbot window 218 which may be an example of chatbot 118 as illustrated in FIG. 1.

In continuing the alarms request 106 example above, as illustrated, the initial screen 205A may include various information, but no information about alarms. Unable to find the information about alarms on initial screen 205A, user 108 may submit a request 106 for the alarms to chatbot 218, "Show me alarms on ABC devices located in Virginia" (shown as 207A) In other embodiments, the initial screen 205A may include the alarms information, but the user 108 may be unable to see where the alarms data is on the initial screen 205A. In this case, user 108 may still submit a request 106 to chatbot 218.

Returning to FIG. 1, as noted above, the request 106 provided to the chatbot 118 may be "Show me the alarms for devices from ABC located in Virginia." In some embodiments, session recorder 101 may store this request 106 as a user query 164 in user history database 160. Profile analysis engine 131 may conduct a form of machine learning or statistical analysis on user queries 164 corresponding to user 108 and find that the user frequently makes the request 106 "Show me the alarms for devices from ABC located in Virginia." This analysis may result in profile analysis engine 131 using prompt constructor 128 to generate a software creation prompt 129 to create a software feature 180 for the user using SFCS 102. In some embodiments, the software feature 180 created by SFCS 102 may be a prompt that predicts the user 108's behavior. In some embodiments, SFCS 102 may create a report based on prompt 106 of FIG. 2A that sends an email to user 108 based on the prompt 106. In this embodiment, that email may be a report of alarms for all ABC devices located in Virginia. In some embodiments, the report may also be displayed to the user on screen 105B.

Figure 2B:
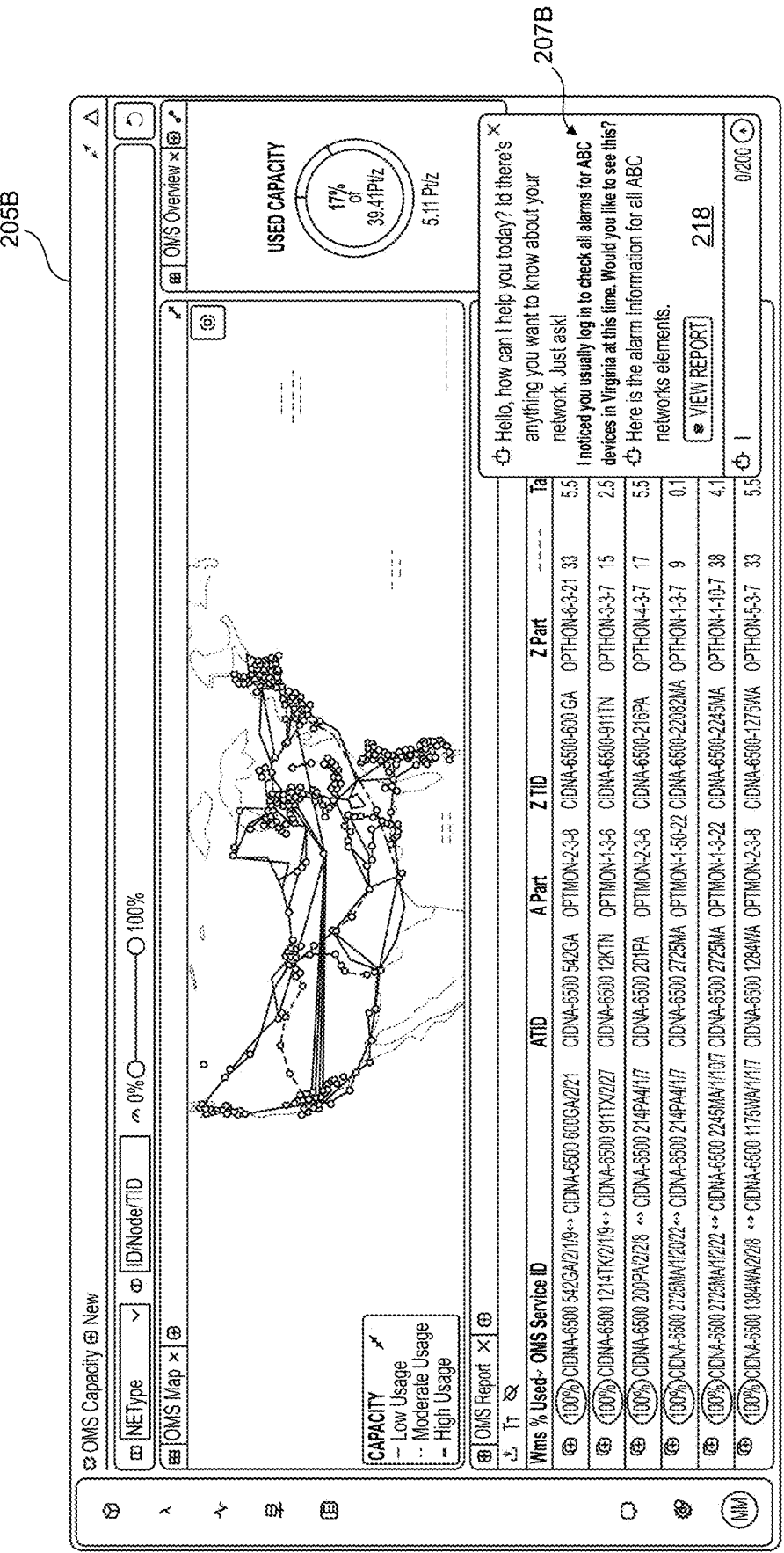
FIG. 2B illustrates an example second screen of a user interface, where a software feature based on user behavior has been created by the system.

FIG. 2B illustrates an example of a software feature 180 created by SFCS 102. Based on analysis conducted by profile analysis engine 131, SFCS 102 uses software feature creation prompt 129 generated by prompt constructor 128 to create a software feature 180 that prompts user 108, "I noticed you usually log in to check all alarms for ABC devices in Virginia at this time. Would you like to see this?" as prompt 207B. Prompt 207B to the user is just one example of a software feature 180 that may be created by SFCS 102. Another embodiment of prompt 207B may be a report of the alarms for ABC devices in Virginia that is displayed on Screen 205B. This report may be displayed based on an affirmative answer for the prompt 207B "I noticed you usually log in to check all alarms for ABC devices in Virginia at this time. Would you like to see this?" that user 108 input to chatbot 118 in a previous user session.

In some embodiments, chatbot 118 may communicate the request 106 to SFCS 102. SFCS 102 may include or have access to a document retrieval system (DRS) 122. DRS 122 may identify any data associated with the request 106 from a document store 127. Document store 127 may include an interface map 144 that may be used to identify which screen 105 of the UI 103 corresponds to the request 106. In some embodiments, document store 127 may include additional documents beyond interface map 144 which may be parsed by DRS 122 in processing request 106. Document store 127 may have customer-uploaded documentation, such as a carrier's internal guides or standards. In other embodiments, document store 127 may have any other useful information that the SFCS 102 may utilize to build a tailored feature.

In some embodiments, interface map 144 may include a blueprint of the UI 103, specifying how data is retrieved, displayed, and the flow between different screens 105. In some embodiments, interface map 144 may provide or define a layout or structure that indicates what data and functionality is available from each of the different screens 105 of the UI 103. In some embodiments, interface map 144 may indicate a navigational flow between the different screens 105 of UI 103 (e.g., which user interface elements load new or different screens 105).

In some embodiments, the interface map 144 may include a schema of the UI 103 for an underlying application, and may define the organization and relationships of data across the various screens 105 of the UI 103. In some embodiments, interface map 144 may include, provide, or correspond to a schema of a database (which may be stored in document store 127), including tables, fields, data types, and constraints. In some embodiments, interface map 144 may include a reference to a template 148 that is used to generate a particular screen 105 of the UI 103.

Figure 3:
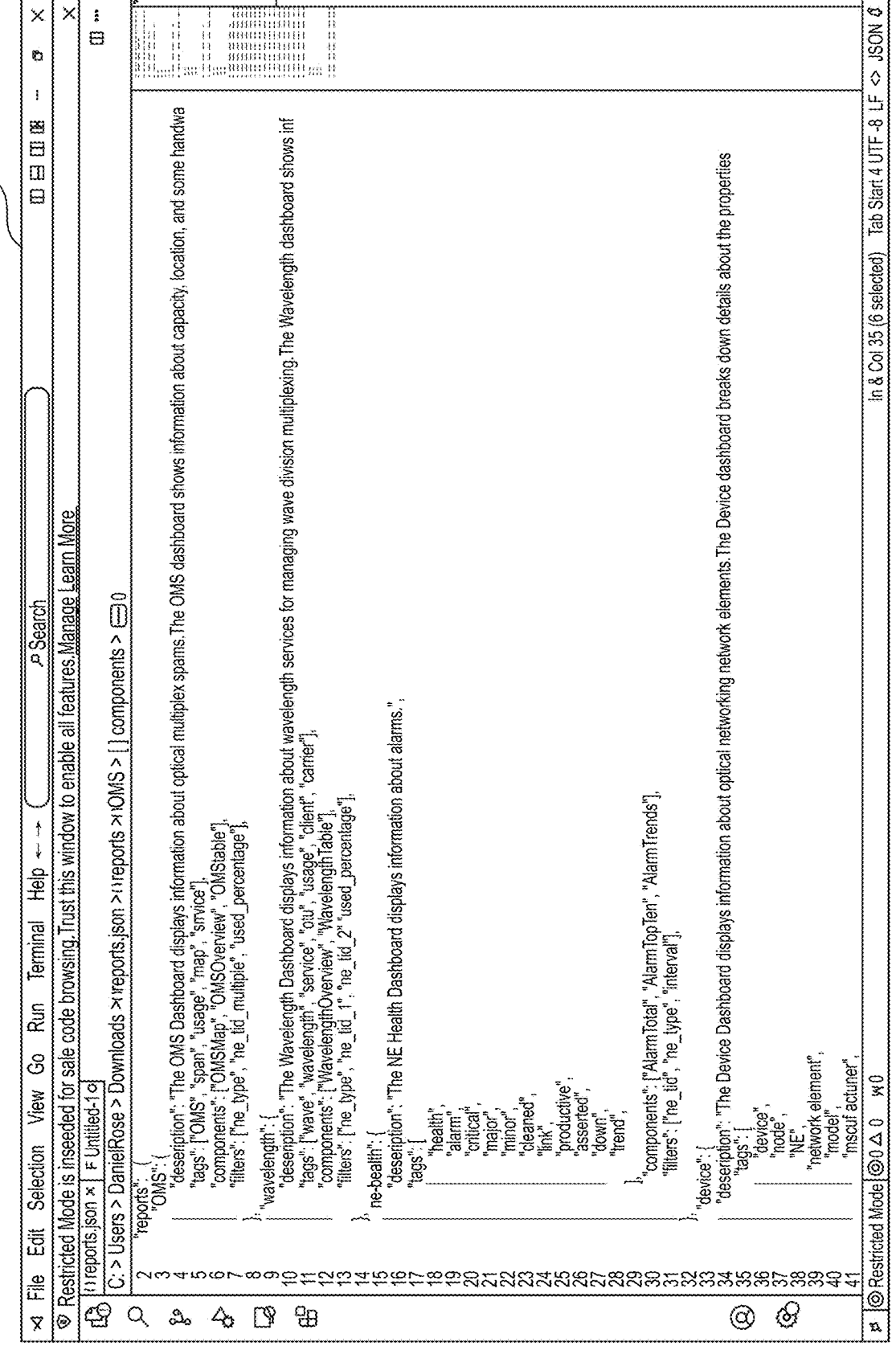
FIG. 3 illustrates an example of an interface map, according to some embodiments.

FIG. 3 illustrates an example of an interface map 344, according to some embodiments. The interface map 344 may be an example of interface map 144 from FIG. 1. In some embodiments, interface map 344 may be text stored across one or more files, including any or all of the information described above.

As illustrated, interface map 344 describes various data and values that may be displayed on a particular screen 105 of the UI 103. For example, on the reports screen, there may be a wavelength portion with a description of what the wavelength is, tags indicating what words of in request 106 may be used to refer to the wavelength, components indicating what wavelength data is displayed, and filters may indicate filtering functionality that may be available by which to filter the wavelength data.

Returning to FIG. 1, because the request 106 is a natural language request (e.g., not in any particular computing code or computing language), the request 106 cannot be executed directly against the interface map 144 to identify a screen 105 of UI 103 related to the request 106. In some embodiments, SFCS 102 may utilize the capabilities of a large language model (LLM) 130 to parse the interface map 144 and identify one or more templates 148 corresponding to the request 106.

In some embodiments a prompt constructor 128 may build or construct one or more prompts for LLM 130 to perform some functionality, including generating some form of output in response to the prompt, related to request 106. A prompt may include one or more lines of text organized across one or more documents that is particularly formatted to by understandable by a large language model (LLM) 130. In an alternative embodiment, instead of LLM 130, a small language model may be used. A prompt may also be a software feature creation prompt 129, which may include instructions for LLM 130 to generate a software feature 180 for user 108 based on analysis performed by profile analysis engine 131.

LLM 130 may include a multimodal model that is able to accept as input and provide as output other types of data beyond natural language. For example, LLM 130 may accept images as input. For example, it may be useful to provide a screenshot to the model to provide additional context to support what the user is viewing. LLM 130 may include an artificial intelligence, machine learning, or deep learning model that is configured to execute data processing commands from plain-text (e.g., not requiring computer language or coded input). LLM 130 understand, generate, and manipulate human language. LLM 130 may be trained on vast amounts of text data. LLM 130 may use deep learning techniques—particularly transformer architectures—to recognize patterns in language and predict what comes next in a sequence of words. This allows it to perform a wide range of language-based tasks, such as answering questions, writing essays, summarizing text, translating languages, coding, and even engaging in conversation. LLM 130 may include any computing system that is configured to perform processing tasks based on text-based or plain language inputs. LLM 130 may be configured to create original content from one or more documents or input in accordance with a prompt. In some embodiments, LLM 130 may include a generative pre-training transformer (GPT). In some embodiments, LLM 130 may include a state space model (SSM) that describes how an internal state of a system evolves over time.

In some embodiments, the functionality described herein may be achieved through a single prompt or multiple prompts for LLM 130. However, for simplicity and clarity, as described herein, the utilization and functionality of LLM 130 will be described with regards to prompt constructor 128 constructing a software feature creation prompt 129. In other embodiments, different or additional prompts may be constructed.

The software feature creation prompt 129 may instruct the LLM 130 to generate a structured view descriptor 152. The structured view descriptor 152 may include one or more instructions to the UI 103 on how to generate a new screen 105B responsive to the request 106 received from the user 108. In some embodiments, the structured view descriptor 152 may include changes from an underlying template 148, which may be used to generate a default version of a screen requested with by the user 108. However, as indicated above, the request 106 may request data 107 and/or access to or the performance of functionality 109 beyond the default version of the screen. LLM 130 may capture these changes in a format understandable or executable by the UI 103 in a structured view descriptor 152 format, file, or document.

In some embodiments, DRS 122 may retrieve and provide the interface map 144 (or portions thereof) as part of the input with software feature creation prompt 129. In some embodiments, DRS 122 may perform a vector search on interface map 144, based on request 106, and identify one or more portions of the interface map 144 that are relevant to request 106. In some embodiments, these one or more portions of the interface map 144 may then be provided to LLM 130 for processing, in lieu of providing the entire interface map 144. In some embodiments, prompt constructor 128 may copy or extract the text of the interface map 144, or an identified relevant portion thereof, and include the text within the software feature creation prompt 129.

LLM 130, in executing software feature creation prompt 129, may identify a template ID 133 of a template 148 associated with the request 106. For example LLM 130 may compare the context and wording of request 106 to the context and wording of interface map 144 (or provided portions thereof), and identify the template ID 133 of a template 148 corresponding to the request 106. Template ID 133 may include any alphanumeric or symbolic identifier corresponding to a template 148, which is used to generate a screen 105 or screen portion of UI 103. In some embodiments, each different portion of the interface map 144 may include a template ID 133 for that portion. In some embodiments, each different template ID 133 may correspond to a different template 148 which is used to generate a different screen 105 of the UI 103.

For simplicity, only a single template 148 is illustrated, however it is understood that there may be any number of templates 148, each corresponding to a different screen 105 or portion of a screen 105 of UI 103, each with its own unique template ID 133. In some embodiments, in executing screen prompt 129, LLM 130 may identify multiple template IDs 133, each of which corresponds to a different template 148 associated with at least a portion of request 106.

LLM 130 may also generate a prompt based on a software feature creation prompt 129 that is assembled in order to convert an instruction from language compatible with the vendor or network device of one network to an instruction that has language compatible to the vendor or network device of another network. This conversion is not limited to network vendors and devices. It may also include carriers, device generations, or any other information associated with a request 106 from user 108 that needs to be converted. In one example, LLM 130 may convert a request 106 from language compatible with Cisco devices with the carrier Verizon to be compatible with Cisco devices with the carrier Lumen, based on a software feature creation prompt 129 assembled by prompt constructor 128.

In some embodiments, the interface map 144 may describe what data and/or functionality is available from each screen 105 (and/or underlying template 148) of the user interface 103. Based on comparing request 106 (which may be provided with screen prompt 129) to this description in interface map 144, LLM 130 may identify the most relevant or corresponding template ID 133 and/or template 148. In some embodiments, interface map 144 may include the text or content of the various templates 148.

As an example, a portion of the interface map 144 may include a description of an alarms screen, and provide the data structures and functionality (e.g., filters) that may be available from the alarms screens, and may also include a template ID 133, corresponding to a particular alarms screen template 148.

In some embodiments, the screens 105 of the UI 103 may each be generated based on a template 148. Template 148 may include a pre-designed structure or framework for screen 105 that provides a foundation for building or generating a screen 105 or a set of screens 105. In some embodiments, the template 148 may be understandable or executable by the UI 103, which may be part of an app, application, browser, or other computing service.

In some embodiments, template 148 may include default settings 150. The default settings 150 may provide a starting point with a pre-set layout, design elements, user interface elements, and preconfigured data 107 and/or functionality 109 (as corresponding to interface map 144) accessible to the user 108 from a screen 105 built from a template 148. In some embodiments, these default settings 150 and any other contents of template 148 may be described in interface map 144 in a manner understandable by LLM 130. In some embodiments, template 148 may include a general layout, color scheme, and user interface elements that may be displayed on a particular screen 105. Template 148 may streamline the screen creation, modification, update, or building process and may allow SFCS 102 to configure and create screens 105 for user 108 based on the request 106 by modifying one or more pre-existing templates 148. In some embodiments, default settings 150 may include default data and/or default functionality available from the template 148.

For simplicity, only a single template 148 is illustrated, however it is understood that template 148 may include any number of templates 148. In some embodiments, each template 148 may correspond to a different screen 105 of UI 103, or multiple screens 105 may share the same base template 148. In some embodiments, template 148 may include a default template with default settings 150 for any new or custom screens or dashboards that may be created based on a request 106.

As noted above, SFCS 102 may provide the user 108 with a way to shortcut past conventional user interface navigation by providing a request 106 to chatbot 118. In these instances, SFCS 102 may utilize LLM 130 to modify the default settings 150 of template 148 to generate a structured view descriptor 152 based on request 106. The structured view descriptor 152 may include a different appearance, structure, and/or settings relative to the underlying template(s) 148. In some embodiments, a user request 106 to see a particular screen 105 of the UI (e.g., "show me the alarms screen") without any additional data request 107 or functionality request 109, may cause the LLM 130 to include the template ID 133 of the alarms screen template 148 in the structured view descriptor 152. Based on this structured view descriptor 152, UI 103 may generate the new screen 105B generated from the default settings 150 of template 148. If there were any modifications or changes to the screen 105B requested by user 108, as included in request 106, these modifications would be included as new instructions in the structured view descriptor 152 that is submitted to the UI 103 to generate the new screen 105B.

As noted above, software feature creation prompt 129 may instruct or otherwise cause LLM 130 to modify the default settings 150 of a template 148 in accordance with request 106. For example, add new instructions to a structured view descriptor 152, which may be used to override any conflicting default settings 150 from the underlying template 148, in accordance with request 106. For example, default settings 150 may indicate that the data should include data for devices for all manufacturers, however the structured view descriptor 152 may indicate to only include data for devices of manufacturer XYZ. Receiving this structured view descriptor 152, UI 103 may initially load the underlying template 148 and default settings 150, but instead of retrieving and displaying all of the data across all manufacturers into the new screen 105B, UI 103 may only load the data for devices of manufacturer XYZ. In some embodiments, LLM 130 may generate and include a query in the structured view descriptor 152 that can be executed against a database to retrieve only the data for devices of manufacturer XYZ, in accordance with request 106.

In some embodiments, the software feature creation prompt 129 may include natural language instructions for the LLM 130 to:

i) act as an intelligent language virtual assistant to provide support for optical network requests, ii) choose template identifiers of the interface map for which the corresponding templates are most likely to contain the data and/or functionality requested by a user or otherwise indicate if no templates are likely to contain the data and/or functionality requested by the user iii) generate any modifications that are to be made to the template(s), corresponding to the chosen template identifier(s), to align them more closely with the request iv) generate a JSON file including both template IDs for the chosen template identifier(s) and the modification(s) to the underlying template(s)

v) provide the JSON file to the UI, vi) prompt user 108 via chatbot 118 based on previous behavior of user 108, vii) create a software feature 180 using SFCS 102 that is based on profile analysis 131's analysis of information stored in user history database 160 and/or network 170.

In some embodiments, the structured view descriptor 152 may reference or include data, functionality, and/or user interface elements from multiple different templates 148 (if multiple template IDs 133 were returned) which are combined together into a structured view descriptor 152 responsive to the request 106. For example, the default settings 150 may indicate that the alarms screen (corresponding to the template 148) does not include functionality to acknowledge an alarm, but the acknowledge alarm functionality may be accessible from a different screen 105 corresponding to a different template 148. Because the request 106 may include a request such as "show me the active alarms, so I can acknowledge one," LLM 130 may combine features from the two different template 148 to generate a structured view descriptor 152 that includes the alarms data from a first template 148 combined with the acknowledge functionality from a second template 148.

As noted above, DRS 122 may be configured to find or identify a document or portion of a document that is related to a request 106. In some embodiments, DRS 122 may execute a query against a vector database (not shown) in the document store 127, to identify a portion of the interface map 144 corresponding to the request 106. From this portion or these portions of the interface map 144, LLM 130 may identify a template 148 and any related filters or functionality, generate a structured view descriptor 152, and send a response with the structured view descriptor 152 to the UI 103. In some embodiments, the structured view descriptor 152 may include the template ID 133 and one or more instructions that indicate any modifications to deviations from the default settings 150 of the underlying template 148. UI 103 may generate a new screen 105B corresponding to the structured view descriptor 152 to be provided to the user 108. In some embodiments, the address of this new screen 105 may be provided to chatbot 118, which may make the new screen 105B accessible to the user 108 via a link 111.

For example, if request 106 asks for "wavelengths with 20% used capacity or less", the LLM 130 may identify a portion of interface map 144 related to wavelengths. From the interface map 144, a 'wavelength' template ID 133 may be identified. UI 103 may have access to the underlying template 148 for the 'wavelength' template ID 133. LLM 130 may generate a structured view descriptor 152, including a reference to the 'wavelength' template ID 133 and any instructions to modify the data to be displayed limiting it to wavelengths with 20% used capacity or less, as indicated by the request 106.

LLM 130 may provide this structured view descriptor 152 to the UI 103 to generate a new screen 105B in response to request 106. In some embodiments, the structured view descriptor 152 may be or include data organized in a structured format, such as a JSON file. An example structured view descriptor 152 is illustrated below:

report_selection:"wavelength"
report_specification:
{used_percentage:"{"lower":0,"upper":0.2}"}
tab_name:"UnderutilizedWavelengths"

As illustrated above, the UI 130 may begin with the template 148 for 'wavelength' and implement the changes (to the default settings 150) as provided in the structured view descriptor 152. Which may include different functionality and/or data. In some embodiments, the interface map 144 and/or template 148 may indicate that additional data is to be retrieved from document store 127 and/or NAD 142. If so, then as part of constructing the structured view descriptor 152, DRS 122 may retrieve this result data 146 from document store 127 and/or NAD 142, which is then included in the structured view descriptor 152 (e.g., JSON file). Result data 146 may include whatever data was identified from the document store 127 and/or NAD 142 to be displayed as part of new screen 105.

In some embodiments, the SFCS 102 may provide the structured view descriptor 152 in an executable format or may generate a new screen 105B (viewable from UI 103) based on the custom template 152 (which may include the result data 146). SFCS 102 may predict a structured view descriptor 152 to provide as a software feature to the user 108 based on analysis of the user 108's previous behavior, or metadata about the user 108 including their user role and communications network conducted by profile analysis engine 131. This prediction may also be based on similarities between other attributes of a user 108 with another user 108. These similarities may include user roles such as administrators, network planners, network provisioners or software developers. Similarities may also include actions performed by different users. As noted above, in some embodiments, SFCS 102 may generate a link 111 to this new screen 105B. The link 111 may be displayed in chatbot 118 responsive to the request 106 and the user 108 may be prompted to click or open the link 111. Upon a selection of the link 111, the new screen 105B may be displayed as part of the UI 103.

Figure 4:
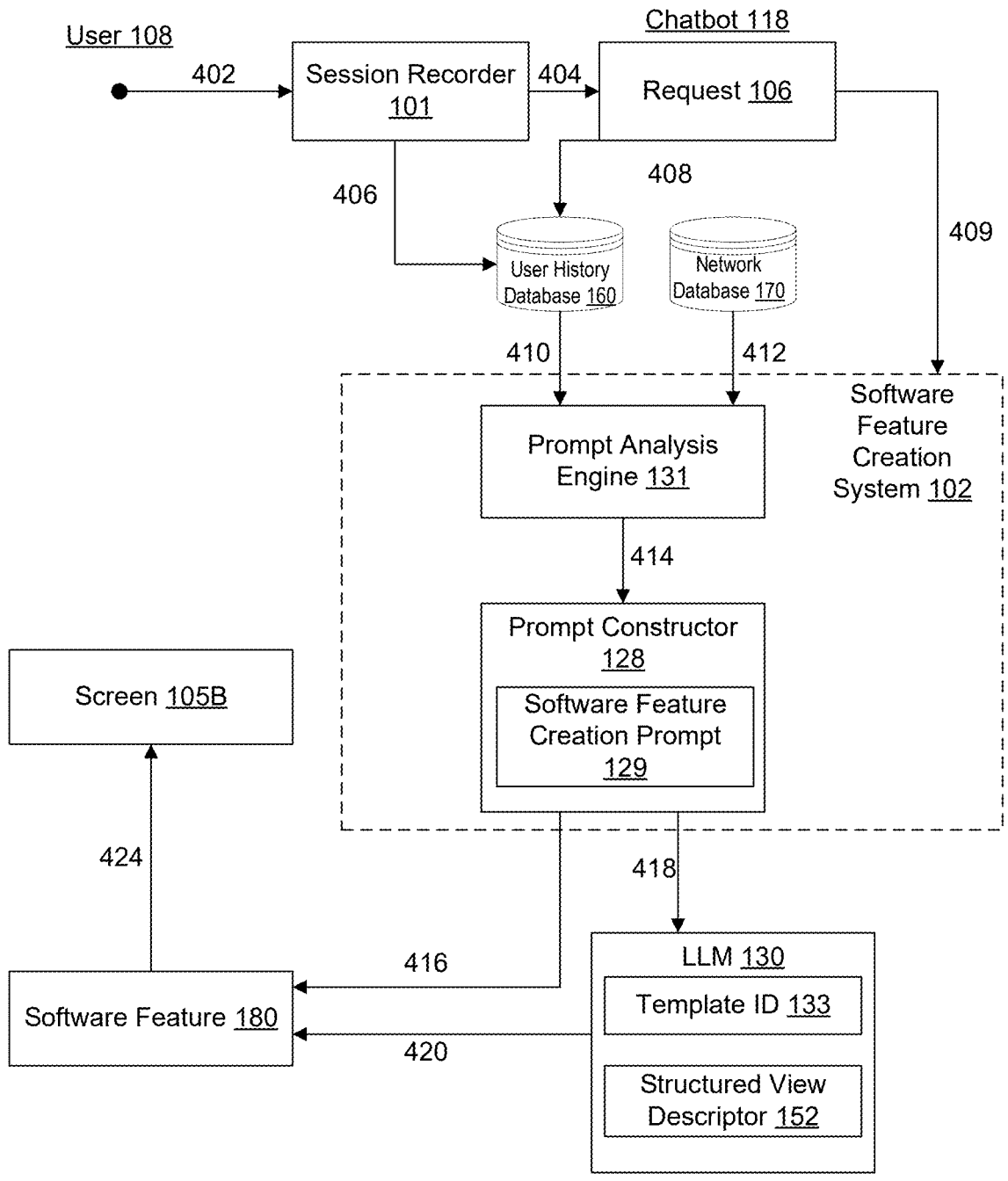
FIG. 4 is a flowchart illustrating an example operation of a software feature creation system (SFCS) for automatically creating a software feature based on analysis of human behavior, according to some embodiments.

FIG. 4 is a flowchart 400 illustrating example operations for performing the automatic creation of a software feature 180 based on software feature creation prompt 129 that is generated by software feature creation system (SFCS) 102, according to some embodiments. Method 400 shall be described, in part, with reference to FIG. 1.

At 402, a user 108 may access a platform to manage a communications network via user interface 103 (not shown in FIG. 4) of a communications network. At 406, session recorder 101 may record user 108's session information and other data associated with the user and may store that information in user history database 160 as user metadata 162 (not shown in FIG. 4). At 404, a user 108 may submit a request 106 by speaking or typing a natural language request into the interface of a chatbot 118. At 408, chatbot 118 may receive this request, and the request may be stored by session recorder 101 in user history database 160 as a query 164 (not shown in FIG. 4).

At 409, request 106 that is received by chatbot 118 may go directly to software feature creation system (SFCS) 102 as the current user request 106. At 410, user metadata 162 and historical user queries 164 may be analyzed by profile analysis engine 131. In some embodiments, at 412 profile analysis engine may also perform analysis based on request 106 using network database 170. This analysis based on network database 170 may occur in conjunction with analysis of user history database 160 or independently. The analysis based on network database 170 and user history database 160 may compare information between the two databases to determine if a particular request 106 is valid. This analysis may also be conducted over different time windows, including, but not limited to, one hour, one day, one month, or one year.

The analysis profile analysis engine 131 performs at 410 and 412 may include several different methods of statistical, data, and machine learning based analysis. The types of analysis may include, but are not limited to, cohort analysis, longitudinal analysis, funnel analysis, linear regression, ridge regression, cosine similarity and machine learning clustering algorithms. These methods of analysis may also be conducted over different time windows, including, but not limited to, one hour, one day, one month, or one year.

At 414, based on the analysis, prompt analysis engine 131 may input the result of the analysis to prompt constructor 128. This analysis may be based on user session information recorded by session recorder 101 such as user permissions, user identification, location information, device information, and click information. It can further include system environment (cloud, on premise, etc.) and licensing information. This analysis may also be conducted over a specific time window. For example, if profile analysis engine 131 determined that user 108 made a similar request to one they have made previously in the past month (e.g., Show me the alarms for all ABC devices in Virginia), prompt constructor 128 may create a software feature creation prompt 129 that prompts LLM 130 at 418 to create a software feature 180 based on that analysis for the user 108. In another example, profile analysis engine 131 may determine that based on requests 106 made by users with carriers AT&T and Verizon, users with Lumen may want to make a similar request 106.

At 420, software feature 180 may be created by LLM 130, which may further use template ID 133 and structured view descriptor 152. This software feature 180 may be a prediction of a user 108's future actions based on analysis from profile analysis engine 131. In some embodiments, this software feature 180 may be a prompt 207B to the user shown in the interface of chatbot 118 asking the user, "I noticed you usually log in to check all alarms for ABC devices in Virginia at this time. Would you like to see this?". In another embodiment, at 424, software feature 180 may be a report that is displayed on screen 105B. In another embodiment, software feature 180 may be an email sent to the user.

At 416, software feature creation prompt 129 may create software feature 180 without using LLM 130. At 424, a software feature 180 that uses a screen 105B may be displayed on screen 105B.

Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1.

At 510, repeatedly over time to generate a historical database, 520, 530, and 540 may be performed. In some embodiments, this time window may include, but is not limited to, one hour, one day, one month, or one year.

At 520, session recorder 101 may record user 108 information and behavior when the user 108 accesses a communications network. This information related to the user 108 may include, but is not limited to, user permissions, user identification, location information, user device information, and click information. The user permissions recorded by session recorder 101 may be further comprised of the following: executive, planning, provisioning, operations, and maintenance. Each of these permissions may correspond to different levels of access to a communications network, and different actions performed by the user 108 in the communications network. The user identification stored by session recorder 101 may include identifying information such as the user 108's name, system ID, and what network carrier they are affiliated with.

At 530, a request 106 from user 108 may be input by the user at user interface 103. In some embodiments, request 106 may be a natural language or spoken request input to the user interface 103. The request 106 may be received via a chatbot 118 while user 108 is viewing a first screen or an initial screen 105A of the UI 103. The request 106 may be a request to access data from a communications network 104. The network 104 may include any number of network devices 110 which provide and/or transmit data to and/or across the communications across the network 104 from device (e.g., one end user device or network device 110) to another device. The network devices 110 may include devices from different vendors or manufacturers, device across different generations or models or manufacturing years, and devices operable across different layers of the communications network 104.

At 540, the request 106 by user 108 may be stored by session recorder 101 in user history database 160 as a query 164. In some embodiments, queries 164 may include all of the previous requests or queries made by user 108. In other embodiments, queries 164 may include requests 106 made by user 108 over a certain time window.

At 550, profile analysis engine 131 may analyze the user historical database 160 and network database 170 to predict a request from a second user 108 at least the similarity of roles between the user 108 and the second user 108. For example, if a first user 108 is a network planner with Verizon makes a request 106, profile analysis engine 131 may predict a request 106 to a second user 108 who is a network planner with AT&T. This analysis based on the similarity of user roles may be used to convert requests from one carrier, device, or vendor type to another by LLM 130. The analysis profile analysis engine 131 performs at 550 may include several different methods of statistical, data, and machine learning based analysis. The types of analysis may include, but are not limited to, cohort analysis, longitudinal analysis, funnel analysis, linear regression, ridge regression, cosine similarity and machine learning clustering algorithms. These analyses may be conducted over a time window including, but not limited to, one hour, one day, one month, or one year.

At 560, based on the analysis of profile analysis engine 131, a software feature creation prompt 129 may be generated by prompt constructor 128. Software feature creation system (SFCS) 102 may use this prompt to create a software feature 180 (Referring to FIG. 1 and FIG. 4) for the user 108. This software feature 180 may predict user 108's behavior based on analysis by profile analysis engine 131 of their past behavior stored in user history database 160. Software feature 180 may also be based on information corresponding to network devices 110 and their associated metadata stored in network database 170. In another embodiment, software feature 180 may be created based on similarity between users. In some embodiments, software feature 180 may be displayed on screen 105B as a report to the user 108. In another embodiment, software feature 180 may be a prompt to the user displayed on the interface of chatbot 118. Another embodiment of software feature 180 may be an email sent to the user. In another embodiment, software feature 180 may be a conversion of request 106 made by user 106 from the syntax required for one network device 110 from a particular vendor, generation, or software version to a syntax of a different vendor, generation, or software version.

Figure 6:
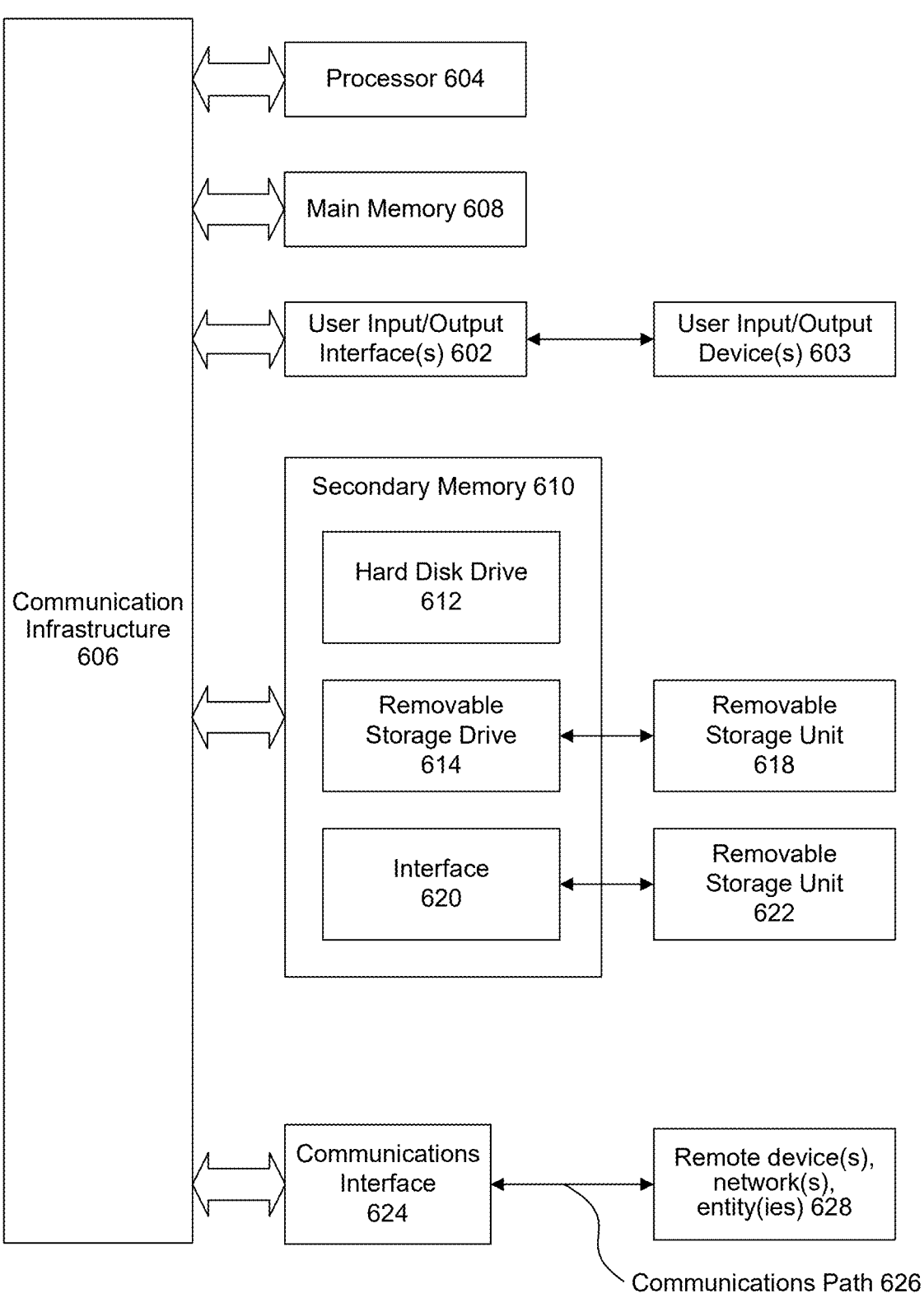
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to LLMs, computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for intelligently creating software features based on user behavior, comprising:
    repeatedly over time to generate a historical database:
        recording a first user's session information when the first user accesses a platform to manage a communications network;
        receiving, via a first screen of one or more screens of a user interface, a first request from the first user to access data describing a first communications network with devices from multiple different vendors and across multiple different generations;
        storing, based on the receiving and the recording, the first user's request and the first user's session information in the historical database, wherein the first user's session information comprises: user permissions, user identification, location information, device information, and click information;
        analyzing historical data in the historical database to predict a second request for a second user to access second data describing a second communications network with devices from multiple different vendors and across multiple different generations such that the analysis generates requests at least based on similarity of roles of the first and second user; and
        based on the second request, generating a second screen of the one or more screens of the user interface to present to the second user.

2. The computer-implemented method of claim 1, wherein a role of the respective first and second user is at least one of an executive, planning, provisioning, operations, and maintenance.

3. The computer-implemented method of claim 1, further comprising:
    assembling a prompt to a large language model including (i) the second request and (ii) an instruction to convert the second request from a first language compatible with a first vendor or generation network device to a second language compatible with a second vendor or generation network device, wherein the first and second languages are different; and
    receiving from the large language model an updated second request, wherein the generating comprises generating the second screen based on the updated second request.

4. The computer-implemented method of claim 1, wherein the analyzing comprises: predicting the second request based on a time window when similar requests are made.

5. The computer implemented method of claim 1, wherein the receiving further comprises: analyzing the first user's request using the historical database and a database comprising an inventory of network devices and network device metadata.

6. The computer-implemented method of claim 1, wherein the analysis comprises: cohort analysis, longitudinal analysis, funnel analysis, linear regression, ridge regression, cosine similarity and machine learning clustering algorithms.

7. The computer-implemented method of claim 1, wherein the second screen comprises: a report displayed to the second user, a prompt to the second user based on analysis of the first user's request and the first user's session information in the historical database, and an email to the second user based on the second request.

8. A system comprising:
    a memory; and
    at least one processor coupled to the memory and configured to perform operations comprising:
    repeatedly over time to generate a historical database:
        recording a first user's session information when the first user accesses a platform to manage a communications network;
        receiving, via a first screen of one or more screens of a user interface, a first request from the first user to access data describing a first communications network with devices from multiple different vendors and across multiple different generations, wherein the receiving further comprises analyzing the first user's request using the historical database and a database comprising an inventory of network devices and network device metadata;
        storing, based on the receiving and the recording, the first user's request and the first user's session information in the historical database;
        analyzing historical data in the historical database to predict a second request for a second user to access second data describing a second communications network with devices from multiple different vendors and across multiple different generations such that the analysis generates requests at least based on similarity of roles of the first and second user; and
        based on the second request, generating a second screen of the one or more screens of the user interface to present to the second user.

9. The system of claim 8, wherein a role of the respective first and second user is at least one of an executive, planning, provisioning, operations, and maintenance.

10. The system of claim 8, the operations further comprising:

assembling a prompt to a large language model including (i) the second request and (ii) an instruction to convert the second request from a first language compatible with a first vendor or generation network device to a second language compatible with a second vendor or generation network device, wherein the first and second languages are different; and receiving from the large language model an updated second request, wherein the generating comprises generating the second screen based on the updated second request.

11. The system of claim 8, wherein the analyzing comprises predicting the second request based on a time window when similar requests are made.

12. The system of claim 8, wherein the session information comprises: user permissions, user identification, location information, device information, and click information.

13. The system of claim 8, wherein the analysis comprises: cohort analysis, longitudinal analysis, funnel analysis, linear regression, ridge regression, cosine similarity and machine learning clustering algorithms.

14. The system of claim 8, wherein the second screen comprises: a report displayed to the second user, a prompt to the second user based on analysis of the first user's request and the first user's session information in the historical database, and an email to the second user based on the second request.

15. A non-transitory computer-readable medium having instructions stored thereon that, when executed by at least one computing device, cause the at least one computing device to perform operations comprising:

repeatedly over time to generate a historical database:

recording a first user's session information when the first user accesses a communications network;

receiving, via a first screen of one or more screens of a user interface, a first request from the first user to access data describing a first communications network with devices from multiple different vendors and across multiple different generations;

storing, based on the receiving and the recording, the first user's request and the first user's session information in the historical database;

analyzing historical data in the historical database to predict a second request for a second user to access second data describing a second communications network with devices from multiple different vendors and across multiple different generations such that the analysis generates requests at least based on similarity of roles of the first and second user;

assembling a prompt to a large language model including (i) the second request and (ii) an instruction to convert the second request from a first language compatible with a first vendor or generation network device to a second language compatible with a second vendor or generation network device, wherein the first and second languages are different;

receiving from the large language model an updated second request; and based on the updated second request, generating a second screen of the one or more screens of the user interface to present to the second user.

16. The non-transitory computer-readable medium of claim 15, wherein a role of the respective first and second user is at least one of an executive, planning, provisioning, operations, and maintenance.

17. The non-transitory computer-readable medium of claim 15, wherein the analyzing comprises predicting the second request based on a time window when similar requests are made.

18. The non-transitory computer-readable medium of claim 15, wherein the receiving further comprises: analyzing the first user's request using the historical database and a database comprising an inventory of network devices and network device metadata.

19. A non-transitory computer-readable medium having instructions stored thereon that, when executed by at least one computing device, cause the at least one computing device to perform operations comprising:

repeatedly over time to generate a historical database:

recording a first user's session information when the first user accesses a communications network;

receiving, via a first screen of one or more screens of a user interface, a first request from the first user to access data describing a first communications network with devices from multiple different vendors and across multiple different generations;

storing, based on the receiving and the recording, the first user's request and the first user's session information in the historical database;

analyzing historical data in the historical database to predict a second request for a second user to access second data describing a second communications network with devices from multiple different vendors and across multiple different generations such that the analysis generates requests at least based on similarity of roles of the first and second user, wherein the analysis comprises: cohort analysis, longitudinal analysis, funnel analysis, linear regression, ridge regression, cosine similarity and machine learning clustering algorithms; and based on the second request, generating a second screen of the one or more screens of the user interface to present to the second user.

20. A non-transitory computer-readable medium having instructions stored thereon that, when executed by at least one computing device, cause the at least one computing device to perform operations comprising:

repeatedly over time to generate a historical database:

recording a first user's session information when the first user accesses a communications network;

receiving, via a first screen of one or more screens of a user interface, a first request from the first user to access data describing a first communications network with devices from multiple different vendors and across multiple different generations;

storing, based on the receiving and the recording, the first user's request and the first user's session information in the historical database;

analyzing historical data in the historical database to predict a second request for a second user to access second data describing a second communications network with devices from multiple different vendors and across multiple different generations such that the analysis generates requests at least based on similarity of roles of the first and second user; and based on the second request, generating a second screen of the one or more screens of the user interface to present to the second user, wherein the second screen comprises: a report displayed to the second user, a prompt to the second user based on analysis of the first user's request and the first user's session information in the historical database, and an email to the second user based on the second request.

* * * * *